(12) United States Patent
Auner

(10) Patent No.: US 9,382,122 B2
(45) Date of Patent: *Jul. 5, 2016

(54) METHOD FOR THE PRODUCTION OF SILICON FROM SILYL HALIDES

(75) Inventor: Norbert Auner, Frankfurt am Main (DE)

(73) Assignee: Spawnt Private S.à.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,346

(22) Filed: Feb. 16, 2012

(65) Prior Publication Data

US 2012/0145533 A1    Jun. 14, 2012

Related U.S. Application Data

(63) Continuation of application No. 11/921,035, filed as application No. PCT/DE2006/000891 on May 23, 2006, now Pat. No. 8,147,656.

(30) Foreign Application Priority Data

May 25, 2005  (DE) .................. 10 2005 024 041

(51) Int. Cl.
*B01J 19/08* (2006.01)
*C01B 33/03* (2006.01)
*B01J 19/12* (2006.01)

(52) U.S. Cl.
CPC .............. *C01B 33/03* (2013.01); *B01J 19/088* (2013.01); *B01J 19/126* (2013.01); *B01J 2219/0875* (2013.01); *B01J 2219/0883* (2013.01); *B01J 2219/0894* (2013.01)

(58) Field of Classification Search
USPC ........................................ 204/164; 423/342
See application file for complete search history.

(56) References Cited

U.S. PATENT DOCUMENTS

| | | |
|---|---|---|
| 2,945,797 A | 7/1960 | Cherrier |
| 3,099,534 A | 7/1963 | Schweickert et al. |
| 3,200,009 A | 8/1965 | Reuschel et al. |
| 3,219,788 A | 11/1965 | Schweickert et al. |
| 3,625,846 A | 12/1971 | Murdoch et al. |
| 3,933,985 A | 1/1976 | Rodgers |
| 3,968,199 A | 7/1976 | Bakay |
| 4,070,444 A | 1/1978 | Ingle |
| 4,102,764 A | 7/1978 | Harvey, II et al. |
| 4,102,985 A | 7/1978 | Harvey, II |
| 4,138,509 A | 2/1979 | Ingle et al. |
| 4,309,259 A | 1/1982 | Sarma et al. |
| 4,374,182 A | 2/1983 | Gaul et al. |
| 4,377,564 A | 3/1983 | Dahlberg et al. |
| 4,382,071 A | 5/1983 | Otsuka et al. |
| 4,404,256 A | 9/1983 | Anand et al. |
| 4,416,913 A | 11/1983 | Ingle et al. |
| 4,604,272 A | 8/1986 | Kratel et al. |
| 4,786,477 A | 11/1988 | Yoon et al. |
| 4,836,997 A | 6/1989 | Lepage et al. |
| 4,908,330 A | 3/1990 | Arai et al. |
| 5,273,587 A | 12/1993 | Guha et al. |
| 5,374,413 A | 12/1994 | Kim et al. |
| 5,505,913 A * | 4/1996 | Bernard et al. .......... 422/186.04 |
| 6,606,855 B1 * | 8/2003 | Kong et al. ..................... 60/275 |
| 6,858,196 B2 * | 2/2005 | Todd .............................. 423/347 |
| 2004/0250764 A1 | 12/2004 | Nagano et al. |

FOREIGN PATENT DOCUMENTS

| | | |
|---|---|---|
| DE | 1 061 593 | 7/1959 |
| DE | 1 982 587 | 4/1968 |
| DE | 25 07 864 | 8/1975 |
| EP | 0 167 156 | 1/1986 |
| EP | 0 282 037 | 9/1988 |
| EP | 0 302 604 | 2/1989 |
| FR | 2555206 | * 5/1985 |
| GB | 754554 | 8/1956 |
| GB | 823383 | 11/1959 |
| GB | 851290 | 10/1960 |
| GB | 883326 | 11/1961 |
| GB | 892014 | 3/1962 |
| JP | 59-195519 | 11/1984 |
| JP | 60-086274 | 5/1985 |
| JP | 60-112610 | 6/1985 |
| JP | 62-143814 | 6/1987 |
| JP | 1-192716 | 8/1989 |
| JP | 1-197309 | 8/1989 |

OTHER PUBLICATIONS

International Search Report of PCT/DE2006/000891, Aug. 24, 2006.
Hata, Kyoshu et al., "Pilot Plant Experiments for Production of High Purity Silicon," Tohoku Daigaka Senko Seiren Kenkyusho Iho 23(1), 1967, pp. 45-54. (Spec, p. 2).
Jeffers, P. M. et al., "Synthesis in a Low Power Microwave Discharge II: Amorphous Silicon Nitride and Polycrystalline Silicon," Journal of Non-Crystalline Solids, vol. 57, 1983, pp. 189-193. (Spec, p. 5).

(Continued)

*Primary Examiner* — Kishor Mayekar
(74) *Attorney, Agent, or Firm* — Collard & Row, P.C.

(57) ABSTRACT

The present invention relates to a method for the production of silicon from silyl halides. In a first step, the silyl halide is converted, with the generation of a plasma discharge, to a halogenated polysilane, which is subsequently decomposed to silicon, in a second step, with heating.

11 Claims, No Drawings

(56) References Cited

OTHER PUBLICATIONS

Giraldo, Oscar et al., "Synthesis and Characterization of Halogenated Amorphous Silicon via a Novel Glow Discharge Process," *Chem. Mater.*, 1998, pp. 366-371. (Spec, p. 6).

Ciszek; T. F. et al., "Solar-grade Silicon from Metallurgical-grade Silicon via Iodine Chemical Vapor Transport Purification," Conference Record of the IEEE Photovoltaic Specialists Conference, 2002, pp. 206-209. (Spec, p. 7).

Andrejew, "J. fur Praktische Chemie", vol. 23, pp. 288-297, 2004.

* cited by examiner

METHOD FOR THE PRODUCTION OF SILICON FROM SILYL HALIDES

CROSS REFERENCE TO RELATED APPLICATIONS

This application is a continuation of and Applicant claims priority under 35 U.S.C. §120 of parent U.S. patent application Ser. No. 11/921,035 filed Nov. 26, 2007, which application is a national stage application under 35 U.S.C. §371 of PCT/DE2006/000891 filed May 23, 2006, which claims priority under 35 U.S.C. §119 of German Application No. 10 2005 024 041.0 filed May 25, 2005, the disclosures of each of which are hereby incorporated by reference. The international application under PCT article 21(2) was not published in English.

BACKGROUND OF THE INVENTION

1. Field of the Invention

The present invention relates to a method for the production of silicon from silyl halides.

2. The Prior Art

In the state of the art, different methods for the production of high-purity silicon are known. In an industrially established process, trichlorosilane $HSiCl_3$ is used, which is thermally decomposed on a hot substrate, in the presence of hydrogen. The decomposition temperatures lie in the range of 800-1300° C., for example in the method described in the patent DE 1061593, which is known as the "Siemens process." A decisive disadvantage of this method of procedure is the low conversion rate of the trichlorosilane used, which makes it necessary to work with large excess amounts of hydrogen, at 3.5 to 16 times the amount in comparison to stoichiometric use, in order to achieve a conversion of 20-40% of the trichlorosilane to silicon. Another disadvantage is that trichlorosilane must be produced, in cost-intensive manner, from metallurgical low-purity silicon and hydrogen chloride HCl (K. Hata, S. Nakamura, S. Yasuda, Japan. Tohoku Daigaku Senko Seiren Kenkyusho Iho 23(1) (1967) 45-54; GB 883326) or from tetrachlorosilane $SiCl_4$ and hydrogen (U.S. Pat. No. 4,836,997; U.S. Pat. No. 3,933,985; U.S. Pat. No. 4,309,259). The latter method only achieves a low yield. In addition, the trichlorosilane introduced into the process is converted into $SiCl_4$, to a great extent, during the precipitation of silicon, thereby making it impossible to simply return the chlorosilane into the process.

In a variant of this process as disclosed in DE 1061593, for example, the cheaper tetrachlorosilane is used as the silicon source, but even lower yields of silicon are obtained, with even greater hydrogen excess.

The precipitation methods of solid silicon from silyl halides at high temperatures have the common disadvantage that particularly these high temperatures promote a reverse reaction of the precipitated silicon with HCl that is also formed during the precipitation, forming silyl halides. A method disclosed in U.S. Pat. No. 3,625,846 counters this circumstance by means of intensive cooling of the product gases.

A starting compound in the case of which no equilibrium with by-products can occur during the precipitation of silicon is monosilane $SiH_4$. However, this product must be produced in cost-intensive manner, for example from trichlorosilane (DE 2,507,864).

According to a more recent method, which is described in DE 1982587 C1, chlorosilanes are hydrogenated with hydrogen, to form monosilane, by means of stoichiometric amounts of alkali metal in salt melts.

The required high activation energies for the reaction of chlorosilanes with hydrogen are furthermore made available, in the state of the art, by means of the use of plasmas. Thus, for example, a capacitatively coupled plasma is utilized in GB 892014, for the decomposition of $SiCl_4/H_2$ mixtures, in order to precipitate silicon on hot surfaces (several hundred ° C.). Chlorosilane/hydrogen mixtures are also converted to melted silicon, in U.S. Pat. No. 4,102,985 and U.S. Pat. No. 4,102,764, using an electric arc discharge, at normal pressure.

Inductively coupled plasmas are also described in the state of the art; for example, the excitation of an $SiF_4/H_2/Ar$ gas mixture to produce a gas discharge by means of an induction coil is described in US 2004/0250764 A1. The resulting silicon precipitates on silicon particles that are passed through the plasma zone.

A method described in GB 851290 precipitates elemental silicon by means of the action of atomic hydrogen on $SiCl_4$, in the manner of a remote plasma source. For this purpose, the atomic hydrogen is generated by means of an electric discharge (50 Hz-100 MHz), at a pressure of 1 Torr, and the silyl halide is subsequently metered in through a nozzle.

In GB 823383, Si droplets are precipitated onto the electrodes by means of the action of an electric arc between electrodes. The electrodes are slowly drawn apart from one another, to the extent that the silicon is growing. Furthermore, microwave radiation for plasma generation in the production of Si is described, whereby very energy-rich microwave pulses of 1 MW power are used in U.S. Pat. No. 2,945,797, in order to achieve coupling-in of the radiation. There, contamination of the reactor wall with silicon is also mentioned, and this is supposed to be countered by means of intensive cooling.

The precipitation of crystalline silicon under reduced pressure, by means of microwave discharge at low power, in $H_2$ that is mixed with 5% $SiCl_4$, is described in the literature (P. M. Jeffers, S. H. Bauer, J. Non-Cryst. Solids 57 (1983) 189-193). U.S. Pat. No. 4,908,330 discloses the production of thin films of silicon at less than 1 Torr pressure, by means of the reduction of $SiF_4/Si_2F_6$ with atomic hydrogen, which is generated by means of a microwave discharge in a separate plasma chamber (remote plasma).

Microwave radiation is also used in U.S. Pat. No. 4,786,477, U.S. Pat. No. 4,416,913, and U.S. Pat. No. 5,374,413, in order to achieve Si precipitation. In these methods, however, the purely thermal effect of the radiation on glowing silicon is utilized in order to heat Si particles to a high temperature, without any plasma formation taking place.

Another form of silicon that can be precipitated by means of plasma discharges is the so-called amorphous silicon, which usually still contains certain amounts of other elements (H, Cl, F, etc.). A method is known from the literature, in which an amorphous silicon is precipitated by means of an electric glow discharge in a gas mixture $SiCl_4/H_2/He$, under normal pressure, which mixture contains not only H but also about 1% Cl (O. H. Giraldo, W. S. Willis, M. Marquez, S. L. Suib, Y. Hayashi, H. Matsumoto, Chem. Mater. 10 (1998) 366-371).

Finally, the transition to polysilanes/polysilylenes is made with an increasing content of halogen and hydrogen in the silicon that is produced; in these, only two of the four possible valences are saturated off by means of bonds to additional Si atoms, on the average. Chlorinated polysilanes are produced in targeted manner, for example as described in JP 62143814, by means of the conversion of elemental Si with chlorine, in inert organic solvents, or as disclosed in JP 59195519, by means of reaction of silicides with chlorine. U.S. Pat. No. 4,374,182, EP 0282037 A2, JP 1197309, and JP 1192716 disclose the formation of silicon from chlorinated polysilanes $Si_nCl_{2n+2}$ by means of disproportionation or reduction with $H_2$, at elevated temperature.

High-purity silicon is also obtained, in the state of the art, by means of transport reactions, using subhalogenides of Si having lesser purity. A process known in the literature converts $SiI_4$ with Si, to produce $SiI_2$, at high temperatures; the latter decomposes again at low temperatures, with disproportionation (T. F. Ciszek, T. H. Wang, M. R. Page, R. E. Bauer, M. D. Landry, Conference Record of the IEEE Photovoltaic Specialists Conference (2002), $29^{th}$ 206-209). Other subhalogenides can also be used for the transport reaction; thus, for example, the use of $SiCl_2$ is particularly described in GB 754554, and the use of $SiF_2$ is particularly described in U.S. Pat. No. 4,070,444 and U.S. Pat. No. 4,138,509.

An economic advantage within a method for the production of high-purity silicon results from the use of inexpensive, easily accessible starting compounds. Preferred products should therefore be the tetrahalogen silanes $SiX_4$, of which $SiF_4$ and $SiCl_4$, in particular, can be produced in cost-advantageous manner. For example, U.S. Pat. No. 4,382,071 describes a method for the characterization of $SiF_4$ from material containing HF and $SiO_2$. $SiCl_4$ can be produced by means of carbochlorination of material containing silicon oxide, according to $$SiO_2 + 2Cl_2 + 2C \rightarrow SiCl_4 + 2CO$$

(Examples: EP 0167156 B1, JP 60112610, EP 0302604 B1), and occurs as a by-product in various technical processes, for example in the production of $HSiCl_3$ from silicon and HCl, or within the Siemens process. Another advantage of $SiCl_4$, in particular, is that it is available with great purity, with the purification technique developed to industrial maturity for the Siemens process, just like the $HSiCl_3$ that is processed nowadays.

Furthermore, the greatest possible conversion rates of the starting compounds that contain silicon to elemental silicon, or at least simple re-use, are desirable. If the use of hydrogen as a reduction agent is unavoidable, the hydrogen feed should not lie significantly above what is necessary stoichiometrically, if possible, in order to allow comparatively small gas volumes per silicon produced, on the one hand, and to have to purify as little hydrogen as possible for re-use, on the other hand.

Methods at temperatures above 1000° C. for the characterization of silicon should be avoided, in order to keep the thermal stress on the apparatus low, on the one hand, and to minimize the risk of contamination of the silicon that is produced by contaminants contained in the reactor walls, on the other hand.

SUMMARY OF THE INVENTION

The present invention is based on the task of making available a method for the production of high-purity silicon, which is characterized by a high conversion rate of the starting compound that contains silicon, a low demand for energy, and the use of cost-advantageous starting compounds.

This task is accomplished, according to the invention, by a method for the production of silicon from silyl halides, in which in a first step the silyl halide is converted, with the generation of a plasma discharge, to a halogenated polysilane, which is subsequently decomposed to silicon, in a second step, with heating.

Compounds of the Type $$H_nSiX_{4-n} (X=F, Cl, Br, I; n=0-3)$$

as well as mixtures of them are referred to as silyl halides in the sense of the method according to the invention.

A halogenated polysilane in the sense of the method according to the invention is, in particular, a pure compound or a mixture of compounds having at least one direct Si—Si bond, the substituents of which consist exclusively of halogen or of halogen and hydrogen, and in the composition of which the atomic ratio of substituents:silicon is at least 1:1. In contrast to the state of the art, the halogenated polysilane suitable for the production of silicon in the method according to the invention is not limited to compounds having pure halogen substitution and atomic ratios of substituent:silicon close to 2.

The method according to the invention is characterized in that a plasma process is used for the production of the halogenated polysilane from silyl halide. In this connection the zone in which the reaction to the polysilane takes place is characterized by comparatively low gas temperatures, as well as by also comparatively low well temperatures of the reactor. In this way, the precipitation of elemental silicon in the reaction zone and on the reactor walls is avoided.

A "plasma" in the sense of the method according to the invention is a gas or gas mixture that is characterized by a variable proportion of non-neutral gas particles, which is elevated as compared with the proportion that occurs by means of the natural ambient conditions.

A "plasma discharge" in the sense of the method according to the invention is the generation of a plasma by means of applying suitable forms of energy to a gas or gas mixture. The plasma discharge is not necessarily accompanied by optical effects, such as visible light, depending on the conditions of the plasma generation.

The halogenated polysilane formed in the first step of the method according to the invention occurs as a liquid, partially also a liquid having great viscosity, and/or as a wax-like, not very compact, colorless to yellow-brown solid, and can easily be removed from the reactor walls and from the reaction chamber, by means of a suitable apparatus structure.

DETAILED DESCRIPTION OF THE PREFERRED EMBODIMENTS

The method according to the invention, for the production of halogenated polysilane, can fundamentally be implemented by means of two different embodiments of the plasma reaction:

A. The plasma reaction takes place in the gas that contains silyl halide.
In this connection, silyl halide can be present in a mixture with hydrogen, hydrogen halide, and/or inert gases, as well as admixtures that promote the plasma discharge. Silyl halide can also be used undiluted.

B. Silyl halide and/or hydrogen is mixed into a gas stream (that can already contain silyl halide), after this stream has passed through a plasma zone (remote plasma).
In this connection, the gas stream that passes through the plasma zone can contain hydrogen or silyl halide and/or inert gases, hydrogen halide, as well as admixtures that promote the plasma discharge.

In both embodiments of the method according to the invention, the plasma generation can be additionally supported by means of suitable measures. Non-limiting examples for such supporting measures are, for example, the injection of electrons from a glow cathode or an electron cannon, or the generation of free charge carriers by means of applying a high voltage or the use of ionizing radiation.

In a variant of Embodiment A of the method according to the invention, a plasma is generated in a mixture of silyl halide and hydrogen, under reduced pressure, by means of the action of an electromagnetic alternating field, for example microwave radiation. The irradiation can take place continuously or discontinuously.

In another variant of Embodiment A, a high voltage (direct voltage or alternating voltage) is additionally applied between two electrodes situated outside of the discharge zone, in order to stabilize the plasma, by means of which voltage the discharge current generates free charge carriers in the discharge zone. As a result, coupling of the electromagnetic alternating field into the gas mixture is significantly facilitated, so that the plasma generation already succeeds at clearly lower irradiation energy than without the high voltage being applied. Furthermore, this high-voltage-supported variant of the method according to the invention permits the use of higher pressures within the reaction zone, so that the amount of polysilane produced per volume and time is increased.

In a variant of Embodiment B, a plasma is generated in a hydrogen gas stream, under reduced pressure, by means of an electromagnetic alternating field, for example microwave radiation, whereby the plasma generation is supported by means of applying a high voltage between two electrodes situated outside of the plasma zone. Following the plasma zone, gaseous silyl halide is introduced into the hydrogen stream; it is converted to halogenated polysilane.

The precipitation of elemental silicon in the plasma generation zone, particularly on the walls, has a negative effect on the plasma generation in some variants of Embodiment A of the method according to the invention, so that in an extreme case, it is suppressed.

The conversion of silyl halide to halogenated polysilane, avoiding the precipitation of elemental silicon, is therefore essential for these variants, since the polysilane does not markedly influence the plasma generation.

In the two embodiments A and B of the method according to the invention, the precipitation of the halogenated polysilane is of significant advantage as compared with the precipitation of elemental silicon known from the state of the art, since the polysilane can be more easily removed from the reactor, because of its consistency.

The temperature of the reactor preferably lies at less than 400° C. during the precipitation of the halogenated polysilane, preferably at less than 300° C. By means of this low temperature, a back-formation of the polysilane formed, with the HCl that occurs as a by-product, to form volatile halogenated monosilanes, is suppressed. At the same time, the undesirable spontaneous formation of elemental silicon in the reactor, for example by means of thermal decomposition of the polysilane formed as the primary product, is avoided.

The reactor walls can be cooled during the precipitation reaction, by means of suitable measures, in order to control the temperature. Examples of suitable measures are passing an air stream by, or the use of cooling fluids adapted to the apparatus structure.

The temperature of the gas that contains silyl halide when it enters into the reaction chamber preferably amounts to between minus 67° C. and 100° C. The temperature of the gas mixture that leaves the reactor preferably amounts to less than 400° C.

Preferably, silyl fluorides or silyl chlorides are used as silyl halides. A particularly preferred starting compound is $SiCl_4$.

The volume ratio of silyl halide:hydrogen preferably amounts to 1:0 to 1:20 in the production of the halogenated polysilane, more preferably 1:2 to 1:10.

For the production of the halogenated polysilane, the pressure within the reaction zone preferably amounts to 0.1-1000 hPa, more preferably 5-100 hPa.

The halogenated polysilane obtained in the first step is decomposed into silicon and volatile silanes in a subsequent second reaction zone of the apparatus, with heating in the presence of slight HCl concentrations, or the polysilane is first removed from the reactor, and converted to silicon in a second reactor.

The decomposition of the polysilane can also take place in the presence of hydrogen and/or inert gases. A gas stream can support removal transport of the volatile decomposition products.

The decomposition of the polysilane can be supported by means of reduced pressure during heating.

In order to decompose the halogenated polysilane, the latter is preferably heated to a temperature of 400° C. to 1500° C., preferably of 450° C. to 1000° C.

In addition to elemental silicon, halogenated monosilanes mainly occur in the thermal decomposition of the halogenated polysilane; these can be passed back into the first step of the method according to the invention.

In the following, the invention will be described using exemplary embodiments.

EXAMPLE 1

A mixture of $H_2$ and $SiCl_4$ (8:1) is passed through a quartz tube having an inside diameter of 10 mm, at a pressure of 10-20 hPa, and a weak glow discharge (~10 W) is generated within the tube by means of a high voltage between two electrodes. Then, pulsed microwave radiation (2.45 GHz) is radiated onto a stretch of 4.2 cm, at pulse energies of 500 to 1500 W, and a pulse duration of 1 ms, followed by a pause of 9 ms, corresponding to an average power of 50-150 W. After 11 h, the brown to colorless oily product is heated in a tubular heater, under vacuum, to 800° C. A gray-black residue forms (2.2 g), which was confirmed as crystalline Si by means of X-ray powder diffractometry. In addition to $SiCl_4$, several grams of a yellowish oil were distilled off; this can also be decomposed to Si, by means of rapid heating.

EXAMPLE 2

In a flask, 1.48 g $SiCl_4$ were evaporated in 2 L hydrogen, at room temperature, corresponding to a mole ratio of 1:10. This mixture was passed through a quartz tube having an inside diameter of 10 mm, at a pressure of ~20 hPa. Microwave radiation (2.45 GHz) was continuously radiated onto a stretch of 4.2 cm, at a power of 200 W. After 30 min, the experiment was terminated and the reaction tube was heated to ~700° C., using a Bunsen burner, in order to decompose the colorless to brown chlorinated polysilane that had precipitated. The yield amounted to approximately 150 mg silicon, corresponding to a yield of about 60% with reference to the $SiCl_4$ used.

EXAMPLE 3

Pure, gaseous $HSiCl_3$ (864 mMol) is passed through a quartz tube having an inside diameter of 25 mm, at a pressure of 5 hPa, and a weak glow discharge (~10 W) is generated within the tube by means of a high voltage between two electrodes. Then, pulsed microwave radiation (2.45 GHz) is radiated onto a stretch of 4.2 cm, at pulse energies of 500-1000 W, and a pulse duration of 1 ms, followed by a pause of 19 ms, corresponding to an average power of 25-50 W. After 6 h, 29 g (≥289 mMol-33% of theory, depending on the hydrogen content, which was not determined) of a light-yellow to dark-yellow oil was isolated, which in part flowed out of the reaction zone on its own during the reaction. The oily product solidifies when stored at room temperature for an extended time, to form a glassy, transparent solid. 5.82 g of the product are pyrolized in a tubular heater, under a weak $H_2$ stream, at a temperature of 900° C. 0.824 g≤96.7% of theory (with reference to the maximal yield in the disproportionation of polysilanes) of a gray-black residue of elemental silicon form.

EXAMPLE 4

A 2 L balloon is filled with a mixture of $H_2$ and $SiF_4$ (1:1; 45 mMol). The resulting gas mixture is passed through a quartz tube having an inside diameter of 13 mm, at a pressure of 10-20 hPa, and a weak glow discharge (~10 W) is generated within the tube by means of a high voltage between two electrodes. Then, pulsed microwave radiation (2.45 GHz) is radiated onto a stretch of 4.2 cm, at a pulse energy of 800 W, and a pulse duration of 1 ms, followed by a pause of 19 ms, corresponding to an average power of 40 W. After approximately 7 h, 0.63 g (approximately 20% of theory) of a white to brownish solid are obtained. When heated to 800° C. in a vacuum, the material decomposes, and silicon is formed.

According to the invention, the decomposition to silicon can take place within or outside of a reactor. The gas in which the plasma discharge is generated can also contain silyl halide.

What is claimed is:

1. Method for producing halogenated polysilanes from silyl halides, wherein a gas comprising a silyl halide in a gaseous state is led into a reactor and the silyl halide in the gaseous state is converted, with a generation of a plasma discharge, to a halogenated polysilane, wherein the halogenated polysilane is removed from reactor walls and from a reaction chamber as a liquid or solid, wherein a temperature of a wall of the reactor is held to less than 400° C. in which the production of halogenated polysilanes takes place and the plasma discharge is generated in the gas, and wherein the gas consists of silyl halide or consists of a mixture of the silyl halide with hydrogen and/or a diluting inert gas and/or admixtures that promote the plasma discharge.

2. Method according to claim 1, wherein compounds of the formula $H_nSiX_{4-n}$ (X=F, Cl, Br, I; n=0-3) or mixtures of them are used as silyl halides.

3. Method according to claim 1, wherein the plasma discharge is supported via an introduction of free charge carriers into a discharge zone.

4. Method according to claim 3, wherein the free charge carriers are generated via applying a high voltage between electrodes.

5. Method according to claim 1, wherein the plasma discharge is generated via radiating in an electromagnetic alternating field.

6. Method according to claim 1, wherein the production of the halogenated polysilane takes place at a pressure of 0.1 to 1000 hPa.

7. Method according to claim 1, wherein a temperature of the gas when the gas enters into the reactor lies between minus 67° C. and 100° C., and a temperature of a gas mixture that leaves the reactor amounts to less than 400° C.

8. Method according to claim 1, wherein the production of the halogenated polysilane takes place at a pressure of 0.1 to 100 hPa.

9. Method according to claim 1, wherein the halogenated polysilane is a pure compound or a mixture Of compounds each having at least one direct Si—Si bond.

10. Method according to claim 9, wherein substituents of the halogenated polysilane consist substantially of halogen or of halogen and hydrogen.

11. Method according to claim 9, wherein in the halogenated polysilane an atomic ratio of substituents:silicon is at least 1:1.

* * * * *